(12) United States Patent
Lee

(10) Patent No.: US 7,758,275 B2
(45) Date of Patent: Jul. 20, 2010

(54) AUTOMATIC FITTING DEVICE FOR ASSEMBLING VEHICULAR PART

(75) Inventor: Jae Youn Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 524 days.

(21) Appl. No.: 11/300,165

(22) Filed: Dec. 13, 2005

(65) Prior Publication Data
US 2007/0108715 A1    May 17, 2007

(30) Foreign Application Priority Data
Nov. 11, 2005    (KR)    ............... 10-2005-0107993

(51) Int. Cl.
*F16B 7/10*    (2006.01)
*A44C 5/14*    (2006.01)

(52) U.S. Cl. .................. 403/166; 24/265 B

(58) Field of Classification Search ............ 403/150, 403/151, 153, 166, 327, 343, 409.1, 359.1, 403/377; 24/265 B; 411/351
See application file for complete search history.

(56) References Cited

U.S. PATENT DOCUMENTS 2,937,842 A * 5/1960 Meek
3,477,107 A * 11/1969 Nadeau .............. 24/265 B
3,544,227 A * 12/1970 Green
3,845,525 A * 11/1974 Gaylord .............. 24/265 B
5,257,964 A * 11/1993 Petters ................. 403/377
5,653,511 A * 8/1997 Herkoperec et al.
6,292,983 B1 * 9/2001 Giaquinta et al.
6,725,004 B2 * 4/2004 Ahn et al. ............. 403/359.1
6,925,904 B2 * 8/2005 Sundaesan et al. ....... 403/154
7,152,285 B2 * 12/2006 Liao

FOREIGN PATENT DOCUMENTS

JP    05-285744    11/1993

* cited by examiner

*Primary Examiner*—Victor MacArthur
(74) *Attorney, Agent, or Firm*—Morgan, Lewis & Bockius LLP

(57) ABSTRACT

An automatic fitting device is configured for assembling a vehicular part. If a spring-forced automatic fitting device is inserted into a bush of a trailing arm of a chassis and the trailing arm is inserted into a vehicular frame in the state in which buttons provided in the automatic fitting device are pushed, the vehicular frame and the chassis are provisionally assembled with each other as the buttons are projected through bolting holes, thereby enabling the automatization of assembling operation and reducing the working hours. In addition, because it is unnecessary to separately manufacture a conventional chassis bracket, the manufacturing costs can be saved.

5 Claims, 6 Drawing Sheets

AUTOMATIC FITTING DEVICE FOR ASSEMBLING VEHICULAR PART

BACKGROUND OF THE INVENTION

1. Field of the Invention

The present invention relates to an automatic fitting device for assembling a vehicular part, and in particular to an automatic fitting device for assembling a vehicular part, wherein the automatic fitting device comprises spring-biased buttons adapted to be fitted in a bush of a vehicular part such as a trailing arm and then inserted into a vehicular bracket, so that the vehicular part can be automatically assembled.

2. Description of the Prior Art

So-called chassis marriage is typically an assembling process for rendering vehicular parts, such as an engine, a transmission, a fuel tank, a fuel line, and a muffler, to be assembled with a vehicular body. This process involves connecting the engine and the transmission with front-wheels and modularizing the fuel tank, the fuel line and the muffler in unison on the rear-wheels, in addition to the modularization of chassis. Through the chassis marriage, the convenience of working can be enhanced and the working hours can be shortened, thereby reducing the basic costs.

In the conventional chassis marriage as described above, a vehicular bracket positioned at the upper side and a chassis and a power train or the like positioned at the lower side are adapted to be vertically moved toward one another, fitted and interconnected with each other by means of automatic fitting devices.

In the above-mentioned chassis interconnection structure, because all parts are in an upright position, no specific problem will occur in assembling upper and lower parts with each other.

However, several parts, such as a trailing arm 1 of the chassis that performs pivotal movement, cannot be assembled by merely vertically lifting them, because their assembling directions are not vertical but inclined with respect to the ground, as shown in FIG. 1a.

Therefore, because it is impossible to automatically fit the trailing arm 1 into a vehicular bracket 3, it is unavoidable for an operator to directly assemble the trailing arm 1 with the vehicular bracket 3, whereby the chassis marriage cannot be employed.

In order to overcome this problem, it has been proposed to use chassis brackets 4 each formed with bolting holes 5 for assembling bolts 6 rather than the vehicular bracket 3 so that the trailing arm 1 of the chassis can be vertically mounted, as shown in FIG. 1b.

However, according to this measurement, the separate chassis brackets 4 will increase the weight and manufacturing costs of the resultant vehicle. In addition, the number of bolts for assembling the chassis brackets is also increased (in order to achieve a proper stability—three bolts are required for each chassis bracket. As a result, the measurement is considered as being inefficient.

SUMMARY OF THE INVENTION

Accordingly, the present invention has been made to solve the above-mentioned problems occurring in the prior art, and an object of the present invention is to provide an automatic fitting device for assembling a vehicular part, wherein the automatic fitting device has spring-biased buttons, so that if the automatic fitting device is fitted in a bush of a trailing arm of a chassis and the trailing arm is inserted into a vehicular frame in the state in which spring-biased buttons are pushed, the vehicular frame and the chassis are provisionally fitted and automatically interconnected with each other as the buttons are projected through bolting holes formed in the vehicular frame, thereby reducing the weight of the resultant vehicle, reducing the manufacturing costs, and reducing the working hours.

In order to achieve the above-mentioned object, there is provided an automatic fitting device for assembling a vehicular part comprising: an outer cylinder having an outer diametric size, the tolerance of which is restrained in terms of the inner diameter of an inner pipe of a bush of a trailing arm; a pair of buttons movably inserted in the opposite ends of the outer cylinder, each button having four projections distributed around one end thereof with a predetermined space from each other; a pair of guide members each formed with a first inclined surface at one end thereof and fitted in the interior of the outer cylinder at the opposite ends of the outer cylinder, respectively, each guide member having two first slots and two second slots for allowing the projections of a corresponding button to be inserted into/separated from the slots, and a guide hole a diameter for preventing the outward escaping of the corresponding button; and a pair of movable members each formed with a second inclined surface at one end thereof and movably fitted in the guide hole of a corresponding guide member, each movable member having two columns provided at the opposite sides thereof.

According to an embodiment of the present invention, the ends of the projections of the buttons are rounded.

According to another embodiment of the present invention, the width of the first slots in the guide members is smaller than that of the second slots.

According to another embodiment of the present invention, the widths of the first and second slots are larger than that of the width of each projection.

Still, according to another embodiment of the present invention, each column has an inclined surface at one end thereof.

In addition, according to another embodiment of the present invention, the width of the first slots is smaller than that of each column and the width of the second slots is larger than that of each column.

Furthermore, according to another embodiment of the present invention, each column is formed in a rectangular shape in cross-section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
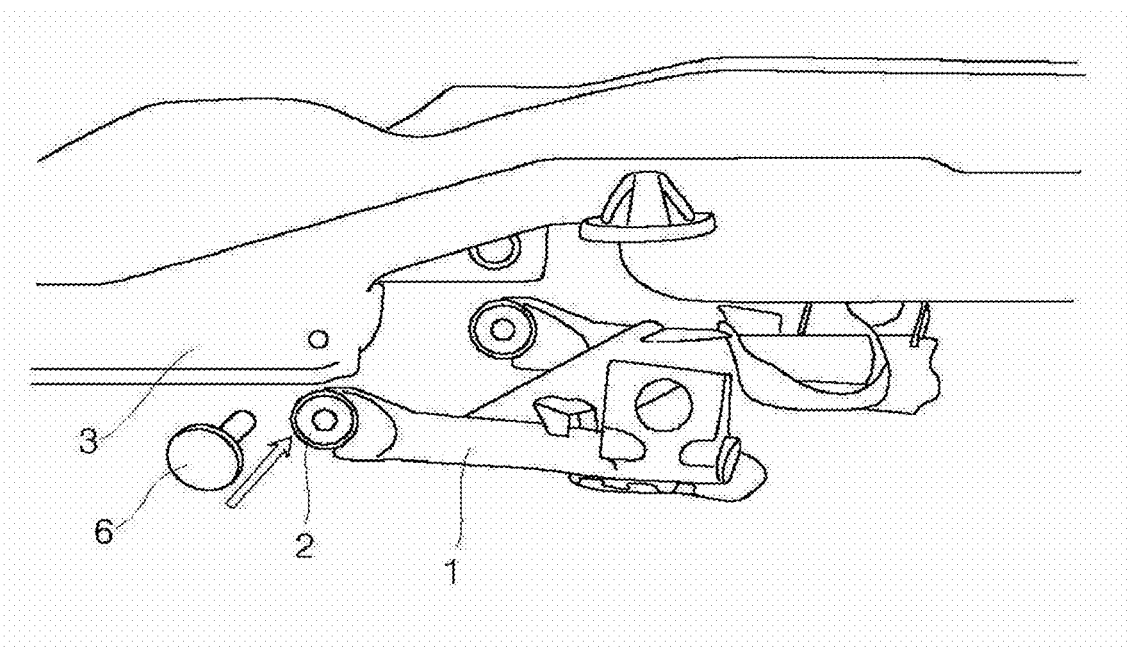
FIGS. 1a and 1b are perspective views showing a conventional automatic fitting device for assembling a vehicular part.
Figure 1B:
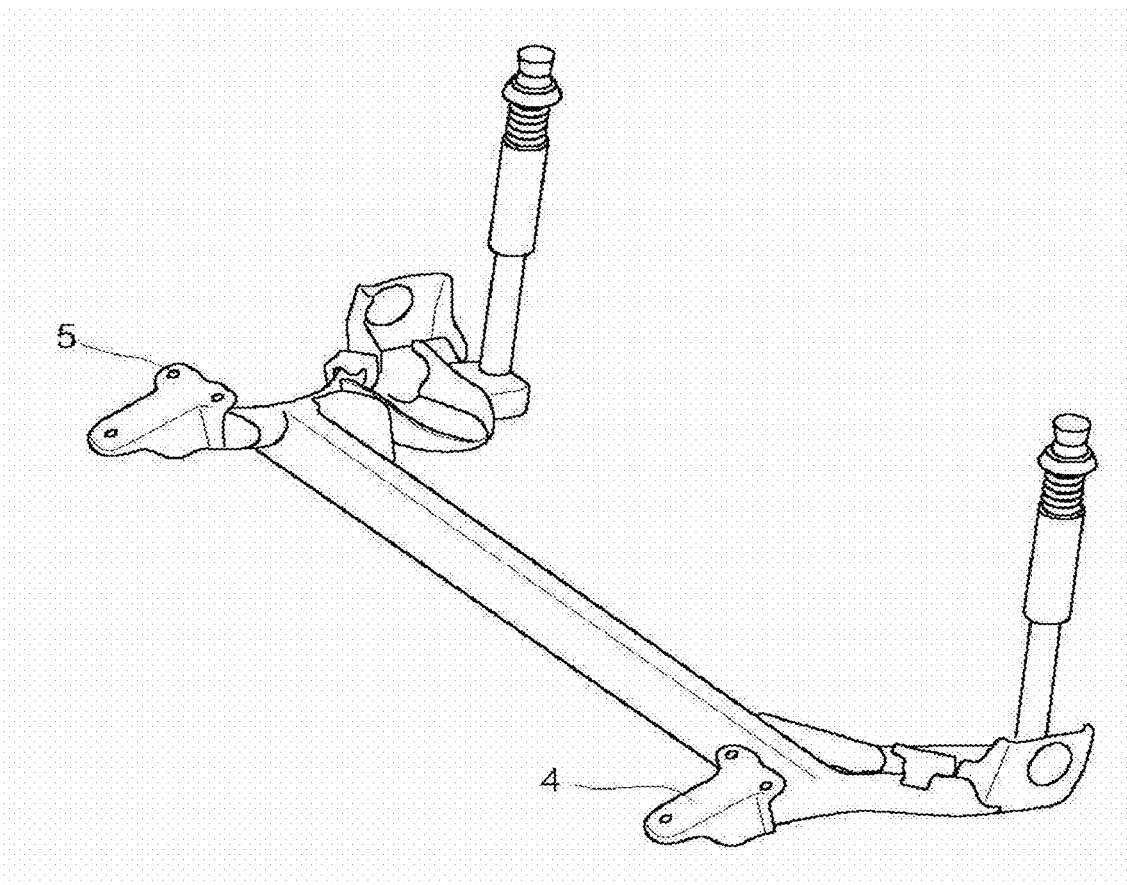

Hereinafter, a preferred embodiment of the present invention will be described with reference to the accompanying drawings. In the following description and drawings, the same reference numerals are used to designate the same or similar components, so that repeated description on the same or similar components will be omitted.

Figure 2:
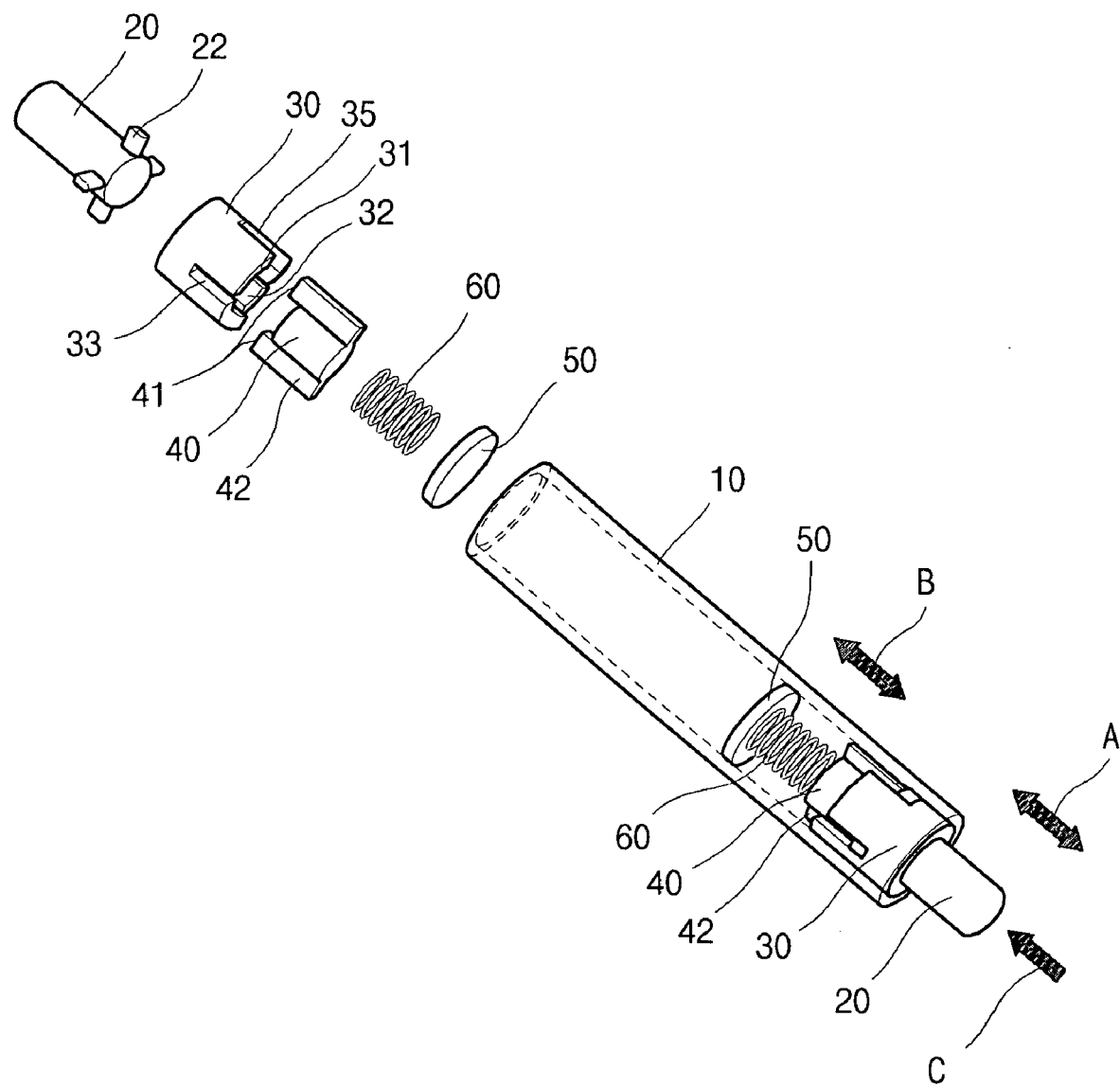
FIG. 2 is an exploded perspective view of the inventive automatic fitting device for assembling a vehicular part.

FIG. 2 is an exploded perspective view showing the inventive automatic fitting device for assembling a vehicular part.

As shown in the drawing, the inventive automatic fitting device for assembling a vehicular part comprises an outer cylinder 10, a pair of buttons 20, a pair of guide members 30, a pair of movable members 40, a pair of support members 50, and a pair of springs 60.

It is preferable that the outer diameter of the outer cylinder 10 is formed in a size that is restrained in tolerance by the inner diameter of an inner pipe, so that the outer cylinder 10 is press-fitted in the inner pipe of a bush 2 of a trailing arm 1, whereby the outer cylinder 10 does not detach from the inner pipe unless the outer cylinder 10 is forcibly separated from the inner pipe.

In the interior of the outer cylinder 10, the support members 50 are fixedly installed at the longitudinal middle area of the interior of the outer cylinder with a predetermined space between them, and the springs 60, the movable members 40, the guide members 30, and the buttons 20 are installed in this order from the opposite surfaces of the support members 50 toward the opposite ends of the outer cylinder 10.

Therefore, the interior of the outer cylinder 10 is configured to allow the buttons 20 to move inwardly or outwardly (arrow A in FIG. 2) in the interior of the outer cylinder 10 as the springs 60 are compressed or returned to their original states (arrow B in FIG. 2) if the buttons 20 are pushed (arrow C in FIG. 2) or the compressive force is released from the buttons 20.

The buttons 20 are respectively slidably fitted in guide bores 32 formed in the guide members 30, which are in turn fitted in the opposite ends of the outer cylinder 10, respectively, wherein one end of each button 20 received in the outer cylinder 10 has four projections 22 distributed around the end and spaced from each other.

The other end of each button 20 located at the outside of the outer cylinder 10 is rounded so that when it is assembled with the bracket 3 of the vehicular body, it can be smoothly inserted/projected into the bracket 3 from the interior of the cylinder 10.

The width of each projection 22 should be smaller than those of the first and second slots 33 and 35 formed in the guide members 30.

Therefore, the projections 22 are inserted into the first and second slots 33 and 35 and moved along them, thereby making the movable members 40 rotate or move.

For this purpose, the ends of the projections 22 are rounded, so that when the buttons 20 are pushed into the outer cylinder 10, the movable members 40 are slid along the rounded surfaces at the ends of the projections 22 and rotate along the guide members 30.

The guide members 30 are fixedly engaged with the opposite ends of the outer cylinder 10, respectively.

Each guide member 30 is formed with a guide bore 32 with a diameter that allows the corresponding button 20 to freely move within the guide bore 32 while preventing the button 20 from escaping out of the outer cylinder 10, and the inner end of each guide member 30 is formed with first inclined surfaces 31 in one direction for guiding the rotation of the corresponding member 40.

In addition, each guide member 30 is formed with two first slots 33 and two second slots 35, wherein the width of the first slots 33 is smaller than that of the second slots 35.

Here, the first and second slots 33 and 35 are formed to be wider than the width of each projection 22 on the buttons 20, so that the buttons 20 can be freely moved through the slots.

However, in comparison to the width of columns 42 provided on the opposite sides of the movable members 40 (the columns 42 will be described later), the width of the first slots 33 is smaller than that of the columns 42 and the width of the second slots 35 are larger than that of the columns 42.

Accordingly, the columns 42 of the movable members 40 can be moved along the second slots 35 so that the movable members 40 can be easily rotated.

Each movable member 40 is formed with a second inclined surface 41 at its end and is removably joined to the corresponding guide member 30, and two columns 42 are provided on the movable member 40 at the opposite sides thereof, respectively.

Here, it is preferable that the columns 42 are formed in a rectangular shape in cross-section, so that they can be easily moved along the second slots 35 of the corresponding guide member 30. In addition, it is also preferable that one end of each column 42 is formed with an inclined surface, so that when the button 20 is pushed in the state in which the inclined surface of the column 42 comes into contact with the rounded surface of a projection 22 of the corresponding button 20, the rotation of the corresponding movable member 40 can be easily performed.

Here, the width of the columns 42 is larger than that of the first slots 33 and smaller than that of the second slots 35, as described above.

The support members 50 serve to fix the positions of the corresponding springs 60. Therefore, the support members 50 shall be fixedly secured to the outer cylinder 10 in the middle area of the interior of the outer cylinder 10, with a predetermined space between them.

Therefore, the support members 50 serve to develop tension and compression force applied to the springs 60 which support their opposite surfaces, each facing one of the opposite ends of the outer cylinder 10, so that the automatic fitting device of a chassis can be suitably operated.

Each spring 60 is interposed between a movable member 40 and a support member 50.

Therefore, the spring 60 is compressed when the button 20 is compressed and is returned to its original position when the button 20 is released, thereby making it easy to provisionally connect the automatic fitting device to the bracket 3 of a vehicle body 3.

Figure 3:
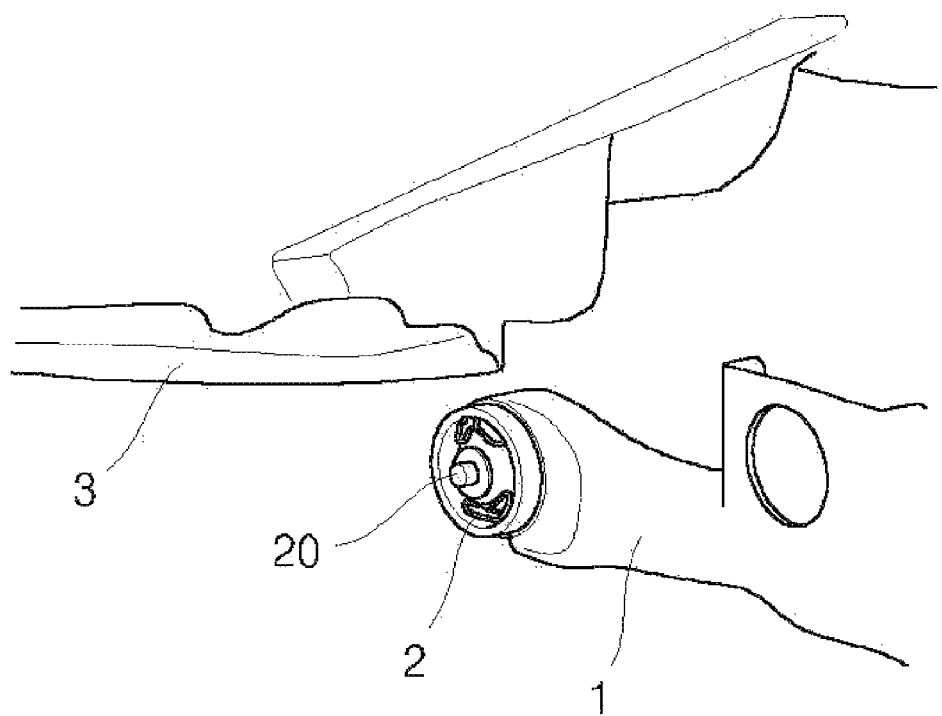
FIG. 3 is a view showing a state in which the inventive automatic fitting device assembled with a bush of a trailing arm.

FIG. 3 shows a state in which the inventive automatic fitting device for assembling a vehicular part is assembled with the bush 2 of the trailing arm 1.

As shown in the drawing, when the automatic fitting device is assembled through the inner pipe of the bush 2, only the buttons 20 are outwardly projected. This is because it is necessary to consider the width of the trailing arm 1 which can be connected to the vehicular bracket 3.

Therefore, if the trailing arm 1, to which the automatic fitting device is connected, is vertically lifted so as to mount the trailing arm 1 on the vehicular bracket 3, the bush 2 comes into contact with the mounting area in the vehicular bracket 3.

If the bush 2 and the vehicular bracket 3 come into contact with each other, the buttons 20 are pushed by contact or frictional forces and retracted into the interior of the outer cylinder 10.

When the buttons 20 are positioned at bolting holes 5 formed in the area for mounting the vehicular bracket 3, the buttons 20 come out from the interior of the cylinder 10 and outwardly project through the bolting holes 5.

Accordingly, the trailing arm 1 and the vehicular bracket 3 are in the provisionally assembled state.

Figure 5:
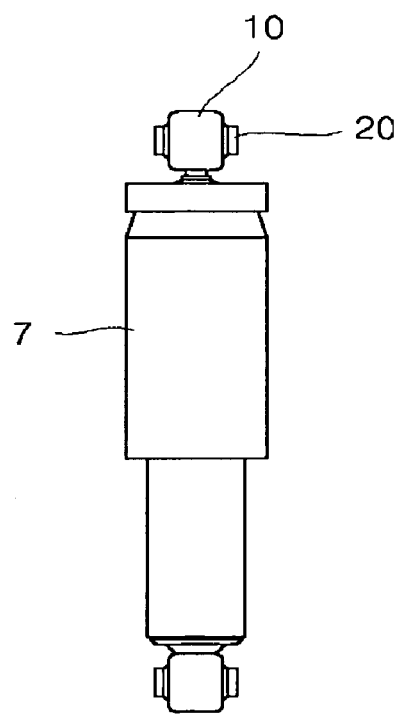
FIG. 5 is a perspective view of a shock absorber provided with the inventive automatic fitting devices.
Figure 6:
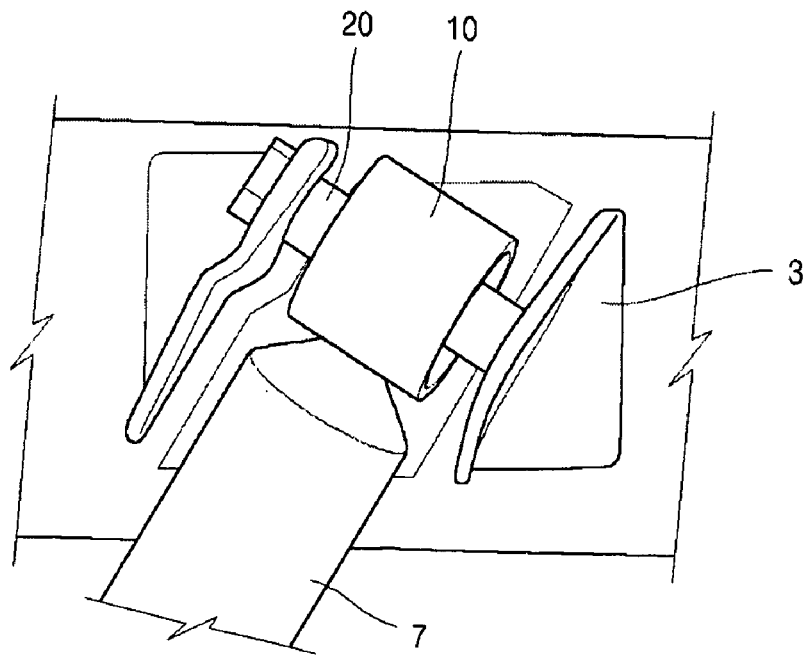
FIG. 6 shows a state in which the shock absorber is fitted in a bracket of a vehicular body.

FIG. 5 is a perspective view showing a shock absorber provided with the inventive automatic fitting devices, and FIG. 6 shows a state of mounting the shock absorber on a vehicular bracket.

As shown in FIGS. 5 and 6, the inventive automatic fitting device can be used to automatically assemble the shock absorber 7 of an eye-eye type to the above-mentioned trailing arm 1 or vehicular bracket 3.

Therefore, by providing the inventive automatic fitting devices, each of which comprises an outer cylinder 10, a pair of springs (not shown) fitted in the interior of the outer cylinder 10 and a pair of buttons 20 elastically engaged in the opposite ends of the outer cylinder 10 by the springs, it is possible to automatically assemble the shock absorber 7 to the vehicular bracket 3 as shown in FIG. 6.

Meanwhile, because most rear shock absorbers for a vehicle have automatic fitting devices like the above-mentioned eye-eye type shock absorber 7, the inventive automatic fitting device can be used for automatic chassis-to-chassis assembly.

The function and operation of the inventive automatic fitting device for assembling a vehicular part are now described.

Figure 4A:
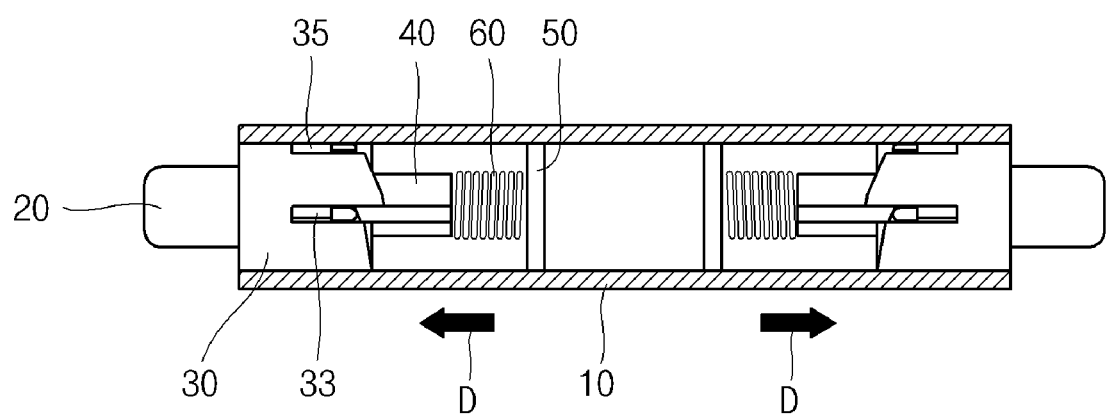
FIGS. 4a to 4c show the functional operation of the inventive automatic fitting device for assembling a vehicular part.
Figure 4B:
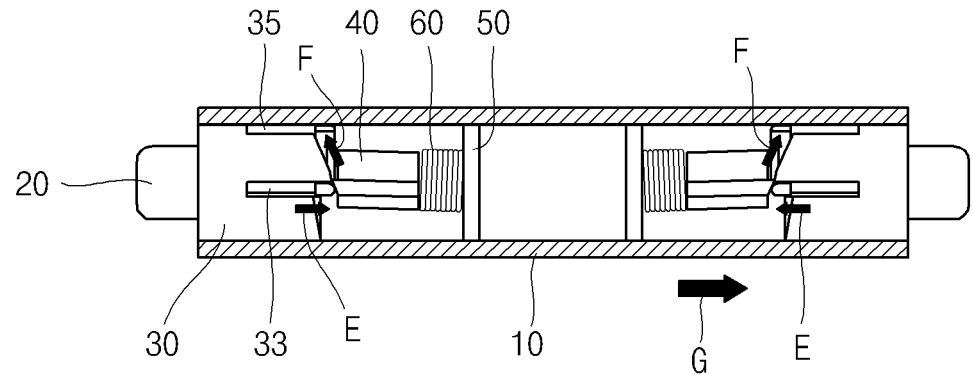
Figure 4C:
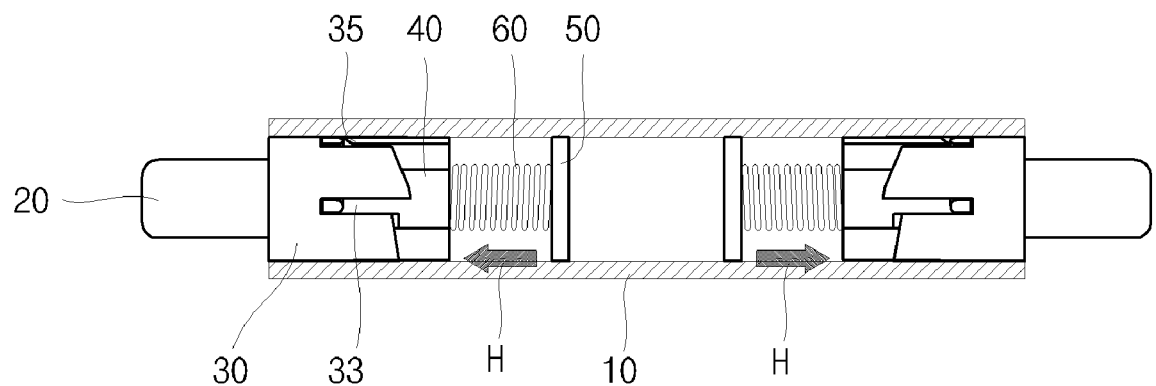
Figure 4D:
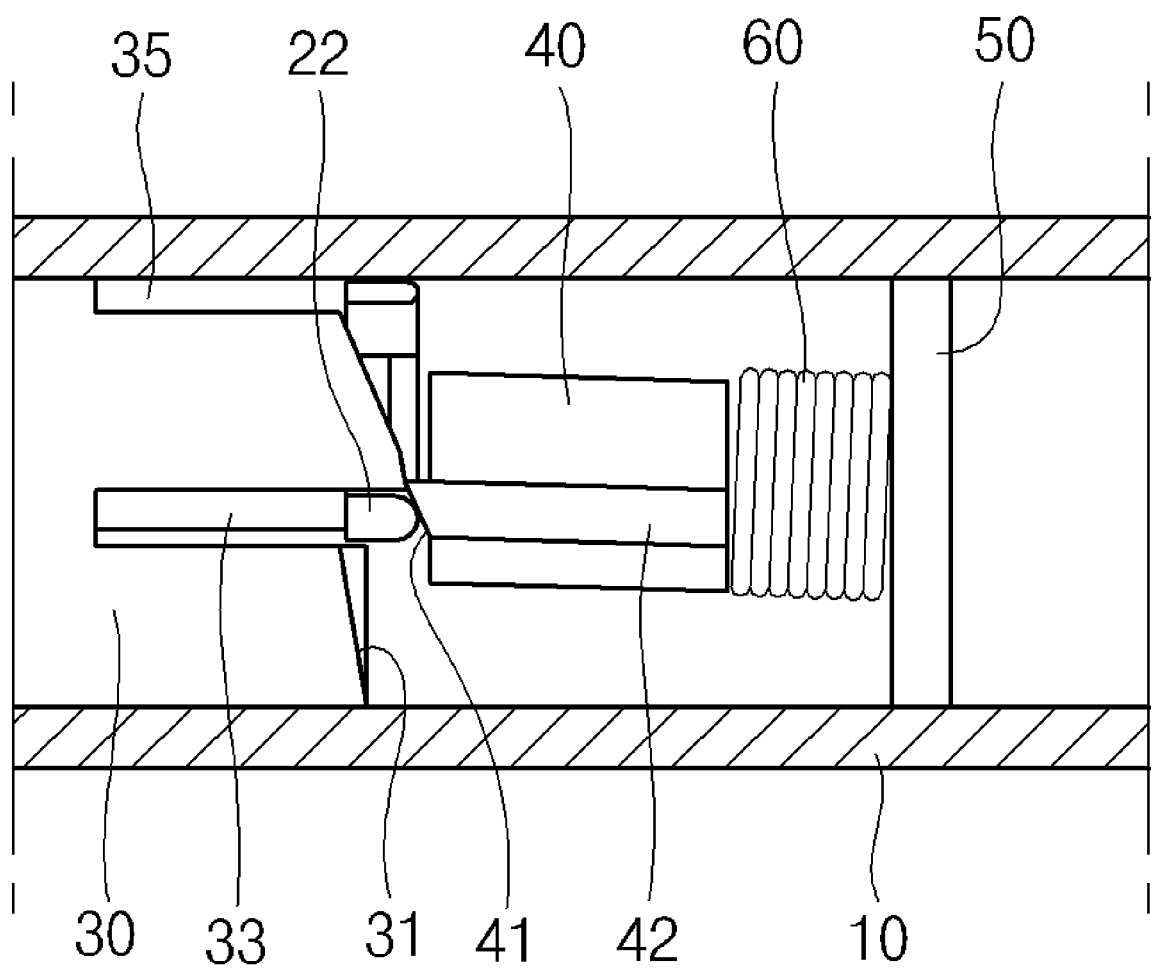
FIG. 4d is a partial enlarged view of FIG. 4b, showing the second inclined surface 41 and the rounded projections 22 in detail.

FIGS. 4a to 4c show the functional operation of the inventive automatic fitting device for assembling a vehicular part.

As shown in FIGS. 3 and 4a, in the state in which the inventive automatic fitting device is fitted in the bush 2 of the trailing arm 1 just before the trailing arm 1 is assembled to a vehicular body, the buttons 20 are in the state of being retracted into the interior of the outer cylinder 10.

From this state, the movable members 40 are pushed into the guide members 30 by the reactive force of the springs 60 (arrows D in FIG. 4a). However, because the movable members 40 are longer than the slots 33, 35 of the guide members 30, the movable members 40 are not pushed any more.

Then, when the trailing arm 1 mounted with the automatic fitting device is assembled to the vehicular bracket 3, the buttons 20 are pushed by the contact and frictional forces produced while the trailing arm 1 is inserted into the mounting area in the vehicular bracket 3.

At this time, because the movable members 40 are also pushed as the buttons 20 are pushed (arrows E in FIG. 4b) and the ends of the projections 22 of the buttons 20 are rounded, the second inclined surfaces 41 of the movable members 40 are slid and rotated along the first inclined surfaces 31 of the guide members 30.

Thereafter, if the trailing arm 1 is assembled with the vehicular bracket 3 and the buttons 20 are aligned with the bolting holes 5, the buttons 20 are projected outwardly through the bolting holes 5 by the reactive force of the springs 60, whereby the trailing arm 1 and the vehicular bracket 3 are provisionally assembled.

During this operation, while being outwardly pushed by the reactive force of the springs 60 (arrow G in FIG. 4b), the movable members 40 are rotated (arrows F in FIG. 4b) and are then entered into the second slots 35 of the guide members 30, thereby pushing the buttons 20 (arrows H in FIG. 4c).

After the trailing arm 1 is provisionally assembled to the vehicular bracket 3 through the above-mentioned operation, the automatic fitting device is removed and the trailing arm 1 and the vehicular bracket 3 are completely assembled by using a bolt.

Here, although the inventive automatic fitting device has been described above only in terms of interconnecting a trailing arm 1 and a vehicular bracket 3, it will be appreciated that the inventive automatic fitting device can also be used for assembling various vehicular parts, for example, chassis-to-chassis assembly, shock absorber-to-vehicular bracket assembly, or shock absorber-to-chassis assembly.

If the inventive automatic fitting device is employed, the following effects can be achieved.

At first, because it is not needed to separately manufacture an instrument such as a chassis bracket for automatically mounting a suspension module of a trailing arm type, the basic cost can be reduced.

In addition, because conventional systems or the like parts can also be automatically assembled, it is possible to reduce the working hours.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An automatic fitting device for connecting a vehicular part to a vehicular body, comprising:

an outer cylinder (10) configured for being coupled to an inner pipe of a bush (2) of a trailing arm (1);

a pair of buttons (20) movably inserted in opposite ends of the outer cylinder (10), each button having four projections (22) distributed around one end thereof with a predetermined space therebetween;

a pair of guide members (30) each formed with a first inclined surface (31) at one end thereof and fitted in an interior of the outer cylinder (10) at the opposite ends of the outer cylinder (10), the guide member (30) having two first slots (33) and two second slots (35) for allowing the projections (22) of the corresponding button (20) to be inserted into or separated from the slots (33) and (35), and a guide hole (32) to slidably receive the button 20 therein and have a diameter for preventing outward escaping of the corresponding button (20);

a pair of movable members (40) each formed with a second inclined surface (41) to be selectively engaged with the first inclined surface (31) and movably fitted in the guide hole (32) of the corresponding guide member (30), each movable member (40) having two columns (42) provided at opposite sides thereof and selectively engaged with the slots (33) and (35);

a pair of support members (50) installed at a longitudinal middle area of the interior of the outer cylinder (10) with a predetermined space between the pair of support members (50); and a pair of springs (60) each installed between the corresponding movable member (40) and the corresponding support member (50), and configured for biasing the corresponding movable member (40) and the corresponding button (20) in a direction toward outside of the outer cylinder (10) through the corresponding opposite end of the outer cylinder (10).

2. An automatic fitting device as claimed in claim 1, wherein the ends of the projections (22) of the buttons (20) are rounded at surfaces that come into contact with the columns (42).

3. An automatic fitting device as claimed in claim 2, wherein the widths of first and second slots (33) and (35) are larger than that of each projection (22).

4. An automatic fitting device as claimed in claim 1, wherein each column (42) has an inclined surface at one end thereof.

5. An automatic fitting device as claimed in claim 1 or 4, wherein each column (42) is formed in a rectangular cross-sectional shape.

* * * * *